US005360309A

United States Patent [19]

Ishiguro

[11] Patent Number: 5,360,309

[45] Date of Patent: Nov. 1, 1994

[54] METHOD AND APPARATUS FOR TRANSFERRING GLASSES FROM RACK TO RACK

[75] Inventor: Fumio Ishiguro, Toyohashi, Japan

[73] Assignee: Hoshizaki Denki Kabushiki Kaisha, Aichi, Japan

[21] Appl. No.: 928,901

[22] Filed: Aug. 12, 1992

[30] Foreign Application Priority Data

Aug. 30, 1991 [JP] Japan ................................ 3-246802

[51] Int. Cl.[5] ............................................ B65G 65/23

[52] U.S. Cl. .................................. 414/404; 414/405; 414/421; 414/766; 53/392

[58] Field of Search ............... 414/403, 404, 405, 419, 414/421, 754, 758, 761, 762, 764, 765, 766; 53/235, 392

[56] References Cited

U.S. PATENT DOCUMENTS 1,110,256 9/1914 Dalgleish ........................... 414/405
2,658,011 11/1953 Price ............................... 414/405 X
3,071,258 1/1963 Seigh et al. ......................... 414/766
4,344,730 8/1982 Drovak .............................. 414/405
4,403,908 9/1983 Cartoceti ........................ 414/403 X
4,830,564 5/1989 Walker et al. ...................... 414/405

FOREIGN PATENT DOCUMENTS 2219783 12/1989 United Kingdom ................ 414/403

*Primary Examiner*—Frank E. Werner
*Attorney, Agent, or Firm*—Koda and Androlia

[57] ABSTRACT

An apparatus for transferring glasses from rack to rack, which comprises a fixed section; a pair of vertical braces disposed to the fixed section to oppose each other with a predetermined distance therebetween; a rotary section supported by the vertical braces so as to be able to rotate horizontally; and a first motor disposed in the fixed section for turning the rotary section at least by 180°; wherein the rotary section further has a partitioning guide consisting of pigeonholes each having dimensions sufficient to allow the glasses to pass therethrough; an upper rack accommodating space defined above the partitioning guide; a lower rack accommodating space defined below the partitioning guide; two pairs of first and second guide plates disposed descendably on the outer side of side panels supporting the partitioning guide therebetween, one end of each guide plate being bent to form an L-shaped rack supporting portion, and each pair being normally pulled nearer resiliently to each other; while the fixed section has mounted thereon a second motor for selectively descending the first slide plates or second slide plates to widen the space below the partitioning guide and also a method of transferring glasses from rack to rack using such apparatus.

2 Claims, 13 Drawing Sheets

METHOD AND APPARATUS FOR TRANSFERRING GLASSES FROM RACK TO RACK

BACKGROUND OF THE INVENTION

This invention relates to a method of transferring a number of glasses carried upside down (in the inverted posture) in a rack having been washed in a dishwasher to another rack into the normal posture (the openings facing upward) and to an apparatus therefor.

Dishwashers which automatically wash tableware such as dishes, teacups and glasses smeared after eating or drinking have been installed and widely utilized in the kitchens of coffee shops and restaurants or even in some households. The dishwasher has an upper rotary nozzle and a lower rotary nozzle in a washing tank thereof, which are allowed to rotate by the reactive force of spraying warm water and to jet out warm water against the tableware carried in a rack placed in the washing tank to carry out dish washing effectively. It should be noted here that the glasses and teacups are allowed to stand upside down (with the openings facing downward) in the rack so as to prevent the warm water from remaining therein.

Due to the reason described above, for example, the glasses drawn out of the dishwasher after completion of washing all stand upside down in the rack. Accordingly, so as to serve customers with glasses of cold water, the inverted glasses must be taken out of the rack to stand in the normal posture one by one. Meanwhile, in large restaurants or hotels, many glasses with ice water must be prepared just in time before a great number of customers are expected to visit. Thus, the glasses standing upside down in the rack must be taken out therefrom one by one to stand them in the normal posture into another rack, before cold water can be poured into them.

The circumstance is that such operation of taking out the inverted glasses from the rack one by one to stand them into the normal posture or transferring the inverted glass from the rack to another rack into the normal posture must have been carried out manually. This inflicts tremendous simple operations on workers to cause them to spend much time, so that a contrivance for improving such condition have strongly been desired.

SUMMARY OF THE INVENTION

This invention has been proposed in view of the above problems inherent in the prior art and with a view to solving them successfully, and it is an object of this invention to provide a method of automatically transferring a number of glasses carried upside down in a rack after completion of washing in a dishwasher to another rack into the normal posture whereby to reduce operation time and eliminate troublesome work, as well as, an apparatus therefor.

According to this invention, after an empty rack is introduced in the normal posture to the space defined below a guide, the rack is turned by 180° together with the guide to bring the rack above the guide in the inverted posture. Another rack carrying washed glasses therein in the inverted posture is introduced to the space below the guide and then turned by 180° together with the guide and empty rack to bring the rack with glasses above the guide. Meanwhile, the empty rack is brought below the guide to resume the normal posture, and the glasses in the rack are orientated upward while the rack is turned over to the upper position, allowing the glasses to fall down into the empty rack in the normal posture.

BRIEF DESCRIPTION OF THE DRAWINGS

The features of this invention that are believed to be novel are set forth with particularity in the appended claims. The invention, together with the objects and advantages thereof, may best be understood by reference to the following description of preferred embodiments taken in conjunction with the accompanying drawings in which:

DETAILED DESCRIPTION OF PREFERRED EMBODIMENT

Figure 1:
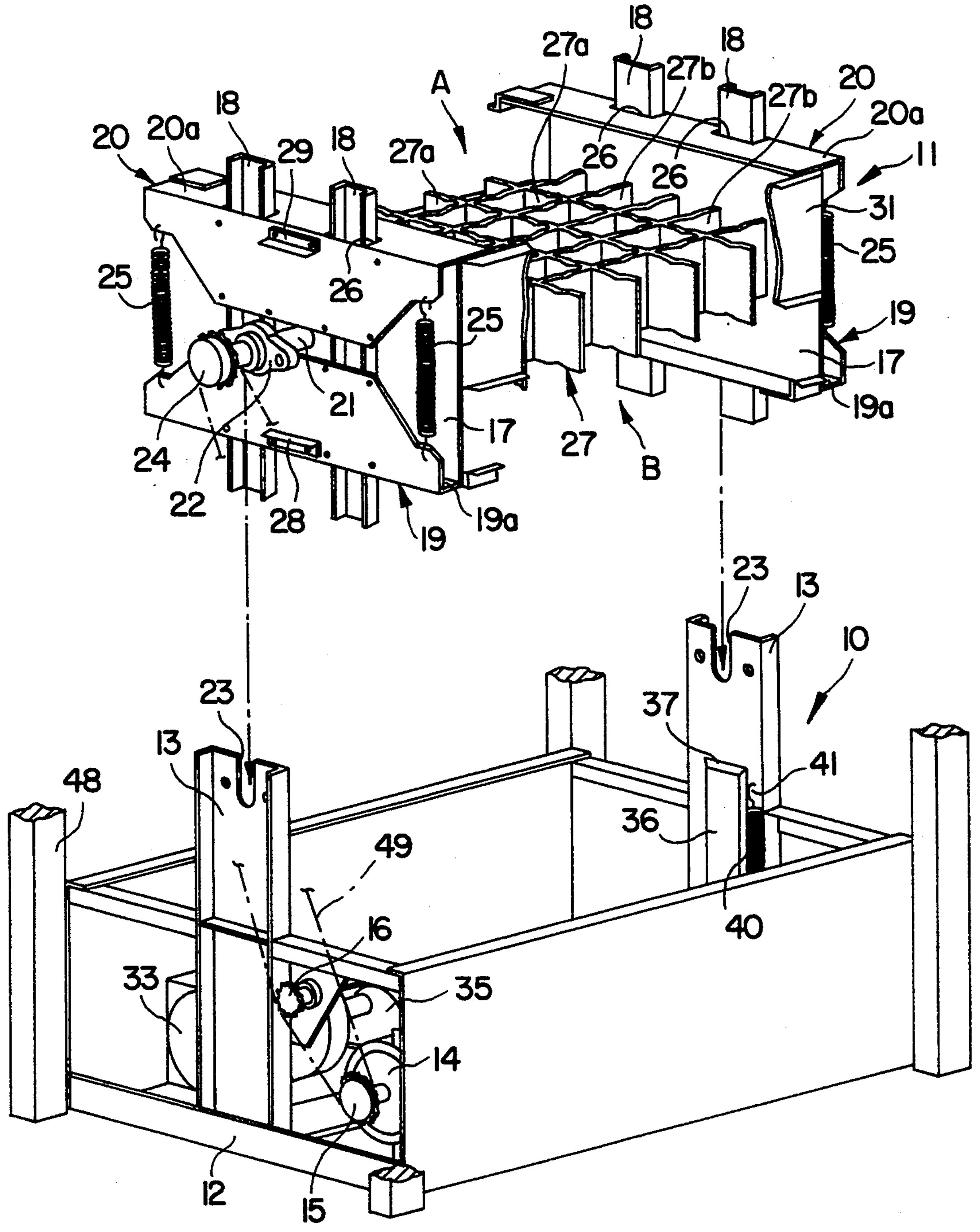
FIG. 1 shows perspectively a partially cutaway view of the glass transferring apparatus according to a preferred embodiment of this invention, in which a rotary section and a fixed section, which are the major sections, are separated vertically from each other.

The glass transferring apparatus according to this invention will now be described by way of a preferred embodiment referring to the attached drawings. FIG. 1 shows perspectively a partially cutaway view of a glass transferring apparatus according to the preferred embodiment of this invention, in which a fixed section 10 and a rotary section 11, which are the major sections, are vertically separated from each other. In other words, in an actually assembled state of this apparatus, bearings 22 of rotary shafts 21 extending horizontally from the rotary section 11 are fixed over supporting notches 23 defined at the upper ends of a pair of opposing vertical braces 13, and the rotary section 11 is designed to be able to make a half turn (180° ) in the desired direction under the action of a first motor 14.

Meanwhile, a pair of side panels 17 in the rotary section 11 each have a first slide plate 19 and a second slide plate 20 disposed in a vertical relationship in such a way that they can be moved closer to or away from each other. Under the rotational action of a second motor 33, the first slide panel 19 (or the second slide panel 20) locating at the lower position in the rotary section 11 can be moved downward to define a rack accommodating space B in the rotary section 11, allowing introduction of an empty rack 46 or a rack 46 with glasses 47 into the space B or removal thereof. Since the present glass transferring apparatus is of extremely intricate mechanical structure, description will be made section by section.

(Constitution of fixed section)

The fixed section 10 is fixed onto the inner bottom surface of a box-like body 48 of the glass transferring apparatus shown partially in FIG. 1 and has a base 12 consisting of a rectangular frame. On the inner surface of the base 12 are disposed (1) a first motor 14 for allowing the rotary section 11 (to be described later) to make a half turn; and (2) the second motor 33 for urging the first slide plate 19 or the second slide plate 20 downward to widen the lower space. The opposing pair of shorter sides of the base 12 have a pair of vertical braces 13 fixed at the middle thereof, respectively, which extend upward from the upper horizontal plane of the base 12 to a predetermined height (a height sufficient to allow the rotary section 11 to be described later to turn without interfering with the base 12). At the top of each vertical brace 13, a notch 23 is defined with which the bearing 22 attached to the rotary section to be described later can be engaged.

Figure 2:
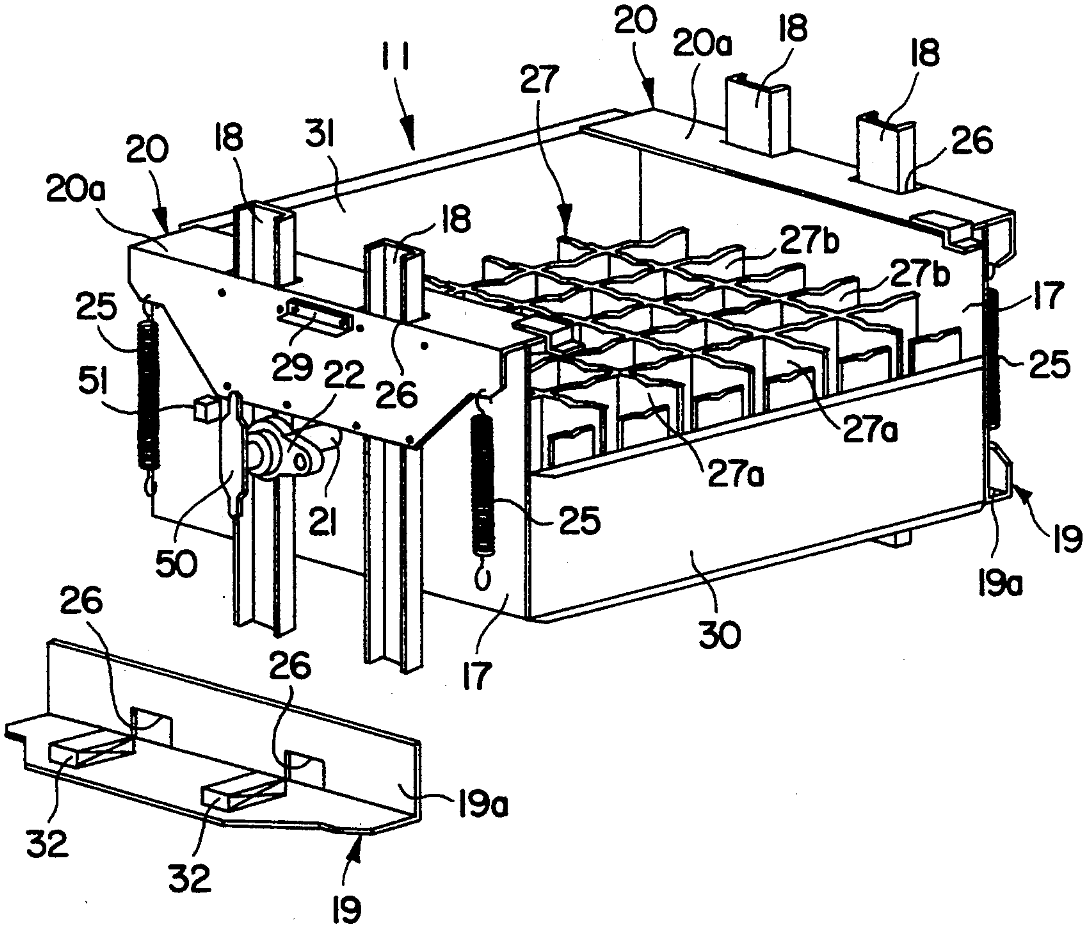
FIG. 2 shows perspectively a partially cutaway view of the rotary section of the glass transferring apparatus according to the preferred embodiment of this invention shown in FIG. 1, viewed from the opposite angle.

The first motor 14 for turning the rotary section 11 by 180° in the desired direction is mounted on the base 12. More specifically, the rotary section 11 is designed to make a half turn in the desired direction by driving the first motor 14 through a chain 49 extended across a sprocket 15 attached to the first motor 14, a sprocket 24 attached to one rotary shaft 21 of the rotary section 11 supported by the vertical braces 13 and a tension adjusting sprocket 16, as shown schematically in FIGS. 6 and 7. Meanwhile, as shown in FIG. 2 where the rotary section 11 of FIG. 1 is viewed from the opposite angle, an attitude detecting piece 50 is secured onto the other rotary shaft 21 of the rotary section 11, and upon detection of the arrival of the detecting piece 50 to a predetermined position by a sensor 51 provided on the other vertical brace 13, the rotation of the first motor 14 is stopped. Incidentally, the mechanism of sliding the first slide plates 19 (or the second slide plates 20) of the rotary section 11 and the constitution of the second motor 33 which is the source of driving the mechanism will be described later referring to FIG. 3.

(Constitution of rotary section)

The rotary section 11 shown in FIG. 1 is provided with a partitioning guide 27 for allowing the glasses 47 to pass therethrough, disposed horizontally at the middle of the height of the rotary section 11. As will be described later, an empty rack 46 is adapted to be set (with the opening facing downward) above the partitioning guide 27 (in the upper space A), while a rack carrying washed glasses 47 therein in the inverted posture is adapted to be set (with the opening facing upward) in the lower space B below the partitioning guide 27. The rotary section 11 is turned by 180° to bring the empty rack 46 to the lower space B below the partitioning guide 27 with the opening thereof to face upward. Simultaneously, the rack 46 carrying the glasses 47 therein in the inverted posture is brought to the upper space A above the partitioning guide 27 to allow the opening of the rack 46 to face downward and the openings of the glasses 47 to face upward. Thus, the glasses 47 in the rack 46 locating in the upper space A fall down by their own weights maintaining their posture toward the empty rack 46 now locating in the lower space B, while the glasses 47 are smoothly transferred from the upper rack 46 to the lower rack 46 by the guiding action of the partitioning guide 27. Incidentally, the rotary section 11 shown in FIG. 2 is viewed from the opposite angle of the rotary section 11 shown in FIG. 1.

Figure 14:
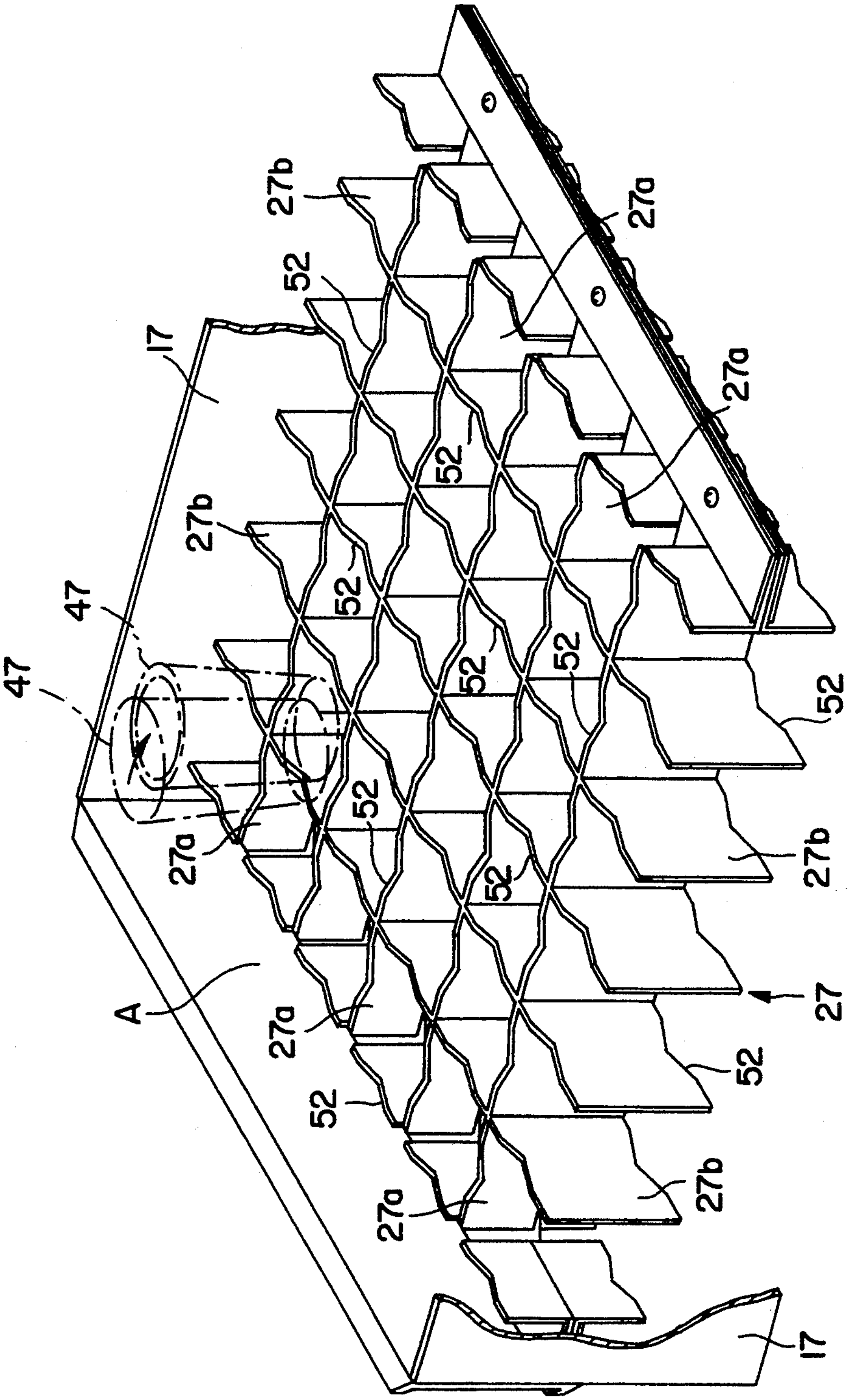
FIG. 14 shows perspectively a schematic constitution of the partitioning guide.

As shown in FIGS. 1 and 2, the partitioning guide 27 consists of longitudinal partitions 27*a* and transversal partitions 27*b* crossing at predetermined intervals to form pigeonholes. The inner dimensions of each pigeonhole are substantially designed to correspond with those of each partitioned space of the rack 46 which is an attachment to the dishwasher not shown. Meanwhile, as shown in FIG. 14, each portion of the longitudinal and transversal partitions 27*a*,27*b* forming each pigeonhole has very gentle V-shaped slopes 52 at the upper end face and the lower end face, respectively. To describe more specifically, when the glasses 47 in the rack 46 locating in the upper space A are transferred to the rack 46 locating in the lower space B, the glasses 47 may not always be transferred smoothly even if the partitioning guide 27 is interposed between the two racks 46. Since each pigeonhole of the rack 46 is designed to provide some clearance between the inner circumference thereof and the outer circumference of the glass 47, the glasses 47 are present within the respective pigeonholes at irregular positions. Accordingly, the bottoms of the glasses 47 are often caught on the upper end faces of the pigeonholes when they are transferred from the upper rack 46 to the lower rack 46. If even one rack should be caught on the upper end face of a pigeonhole, it interferes with the inner portions of the rotary section 11 to make it very difficult to draw out the rack therefrom. The V-shaped slopes 52 are formed at the upper and lower end faces of the respective sides of each pigeonhole so as to allow the glasses 47 if caught by the bottoms on the upper end faces of the pigeonholes to slide along the V-shaped slopes 52 to be guided properly and transferred downward to the lower rack 46.

A pair of side panels 17 are fixed perpendicularly on each longitudinal side of the partitioning guide 27, and a first wear plate 30 and a second wear plate 31 are disposed between the opposing pair of side panels 17, as shown in FIGS. 1 and 2. It should be noted, however, that the rack 46 is adapted to be always introduced to or drawn out of the lower space B defined below the partitioning guide 27 in a horizontal posture from the right side in terms of FIG. 1. Accordingly, the first wear plate 30 is disposed at the lower right position of the rotary section 11, while the second wear plate 31 at the upper left position of the rotary section 11, as shown in FIG. 2. This disposition of the wear plates 30,31 is intended to secure an inlet to the lower space B always at the lower right position of the rotary section 11 whenever the rotary section 11 is turned by 180° to allow the wear plate 30 to locate at the lower left position and the wear plate 31 to locate at the upper right position in terms of FIG. 1, or vice versa to prevent running out of the racks 46 from the rotary section 11. The rotary shafts 21 are fixed on the respective side panels 17 to extend horizontally from the centers thereof, and a bearing 22 is rotatably supported on each shaft 21. As described above, the bearings 22 are fixed over the notches 23 of the vertical braces 13 to rotatably support the rotary section 11 relative to the fixed section 10. Incidentally, the sprocket 24 is attached to the free end of the rotary shaft 21 extending leftward in terms of FIG. 1.

(Constitution of slide plates in rotary section)

As shown in FIGS. 1 and 2, a pair of parallel guide rails 18 are fixed vertically on the outer face of each side panel 17 in such a way that the rotary shaft 21 may locate therebetween, and the guide rails 18 extend upward and downward from the upper end face and lower end face of each side panel 17 with a predetermined length, respectively. The first slide plate 19 and second slide plate 20 each having a couple of slide bearings 32 which slidably engage with the respective guide rails 18 are disposed to oppose each other in a vertical relationship. In other words, one end portion of the first slide plate 19 (second slide plate 20) is bent inward to form an L-shaped rack supporting portion *19a* (*20a*) on which the rack 46 to be described later is supported. A couple of slots 26 through which the guide rails 18 are inserted are formed at the bend of each slide plate 19 (20).

As shown in FIG. 1, a pair of tension springs 25 having sufficient resilience are interposed resiliently between the first slide plate 19 and the second slide plate 20 to pull them to the closest positions to each other. An L-shaped first engagement piece 28 is fixed on the outer side of the first slide plate 19 with its free end portion extending horizontally, which is designed to be engageable with a tongue 37 of a slider 36 to be described later referring to FIG. 3. An L-shaped second engagement piece 29 is likewise fixed on the outer side of the second slide plate 20 to be engageable with the tongue 37 of the slider 36 to be described later.

(Mechanism of selectively moving slide plates downward)

As described above, the first slide plate 19 and the second slide plate 20 disposed descendably to oppose each other in a vertical relationship are constantly pulled nearer to each other by the tensile resilience of the tension springs 25. Accordingly, in order to introduce or draw out an empty rack 46 or a rack 46 carrying glasses 47 therein the inverted posture to and from the lower space B defined below the partitioning guide 27 in the rotary section 11, the first slide plate 19 (or the second slide plate 20) locating at the position lower than the partitioning guide 27 must be slid downward to a predetermined stroke to widen the lower space B. Therefore, the mechanism of sliding the first slide plate 19 downward will be described referring to FIG. 3. Incidentally, it should be appreciated that the mechanism of sliding the second slide plate 20 downward is of exactly the same constitution.

Figure 3:
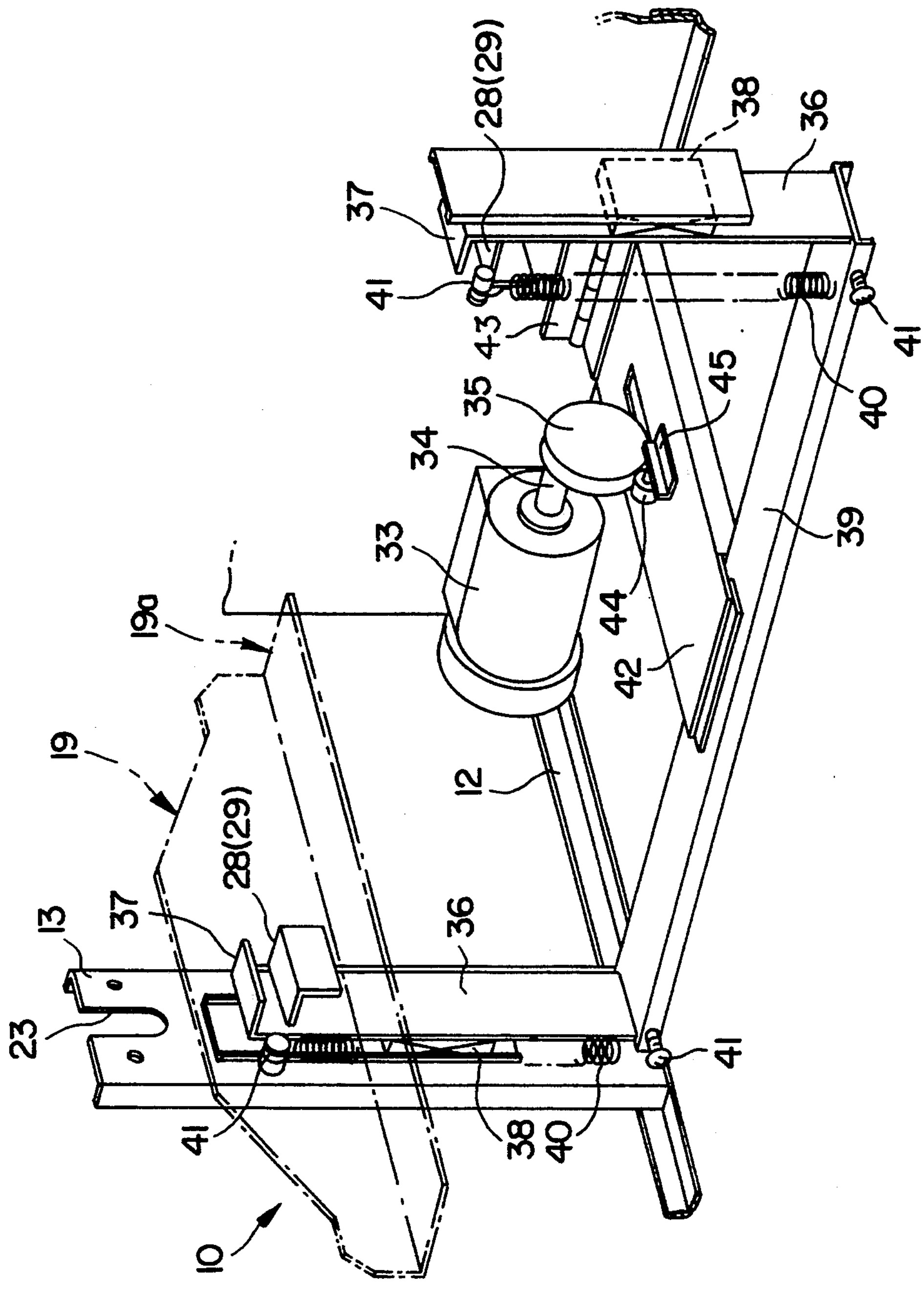
FIG. 3 shows schematically in perspective view the mechanism of sliding a first or second slide plate in the rotary section downward with a predetermined stroke together with a second motor which is the source of driving the sliding mechanism.
Figure 5:
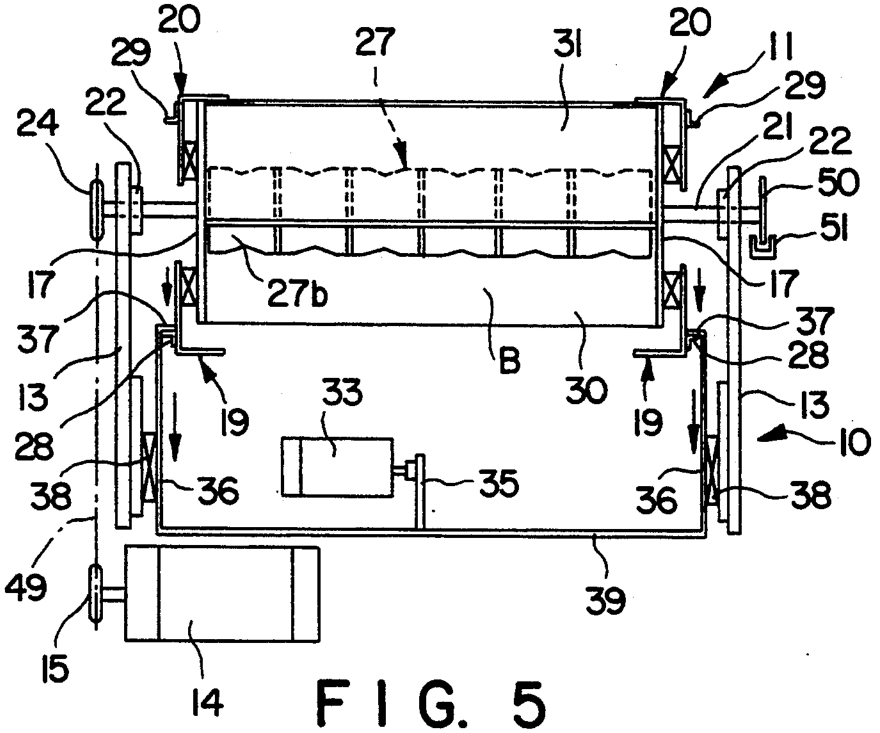
FIG. 5 shows schematically in vertical cross section the apparatus shown in FIG. 4, in which the slide plates provided in the rotary section are slid downward with a predetermined stroke relative to the partitioning guide by driving the second motor.
Figure 4:
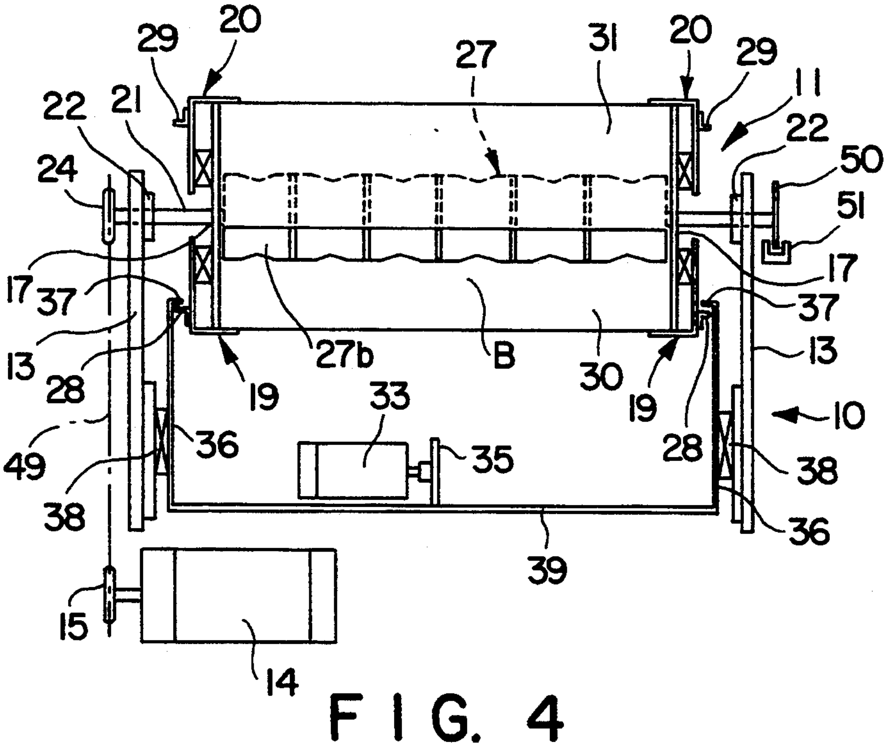
FIG. 4 shows schematically in vertical cross section the positional relationship between the fixed section and the rotary section in the glass transferring apparatus according to the preferred embodiment of this invention, in the static state where the second motor is not driven.

FIG. 3 shows schematically the inner side of the base 12 of the fixed section 10 with which the rotary section 11 is integrated, in which the first slide plate 19 of the rotary section 11 locates at a position inner than one vertical brace 13. The slider 36 is descendably disposed on the inner side of the vertical brace 13 via a slider bearing 38, while another first slide plate 19 likewise locates at a position inner than the other vertical brace 13, which are omitted in FIG. 3, with another slider 36 being descendably disposed on the inner side of the vertical braces 13 through a slider bearing 38. The sliders 36 are both connected at the bottoms to a horizontal plate 39. A tension spring 40 is resiliently retained by a pin 41 protruding from each vertical brace 13 at an upper position and a pin protruding from the horizontal plate to protrude horizontally, which normally pulls up the sliders 36 toward a predetermined positions. The upper end portion of each slider 36 is bent to form an L-shaped tongue 37 extending inward horizontally. The horizontal portion of the first engagement piece 28 disposed to the first slide plate 19 is adapted to be positioned below the tongue 37 in the state where the operation of the rotary section 11 is stopped. Accordingly, each tongue 37 is abutted against the first engagement piece 28, as shown in FIG. 5, by sliding the sliders 36 downward as will be described later, to pull as such the first slide plate 19 downward against the resilience of the tension spring 25.

In other words, the horizontal plate 39 is interlocked with one end portion of a swing plate 42 disposed to intersect therewith, and the other end portion of the swing plate 42 is fixed to the base 12 through a hinge 43. An eccentric cam 35 is attached to a rotary shaft 34 of the second motor 33, which is abutted against a roller 44 supported onto the swing plate 42 through a bracket 45.

Accordingly, by rotating the second motor 33 to swing the swing plate 42 upward or downward on the hinge 43, the both sliders 36 can be ascended or descended. Incidentally, descending motion of the sliders 36 is achieved by the cam action between the eccentric cam 35 and roller 44, while the ascending motion thereof is achieved by releasing the cam action applied against the resilient resetting action of the tension springs 40.

Next, action of the glass transferring apparatus according to this embodiment will be described below. FIGS. 6 to 13 show the entire process of operations in the rotary section 11: (1) a first state, where no rack 46 is introduced to the upper space A defined above the partitioning guide 27 or the lower space B defined therebelow; (2) an intermediate state, where an empty rack 46 is set (width the opening thereof facing downward) in the upper space A defined above the partitioning guide 27, while a rack 46 carrying washed glasses 47 therein in the inverted posture is set (with the opening thereof facing upward) in the lower space B; (3) a stage where the rotary section 11 is turned by 180° to transfer the glasses 47 to the empty rack 46; and (4) a final stage, where the rack 46 carrying the glasses therein in the normal posture is drawn out. Incidentally, FIGS. 6 to 13 each show schematically the glass transferring apparatus according to this embodiment in vertical cross section on the left side against left side view on the right side, respectively.

Figure 6B:
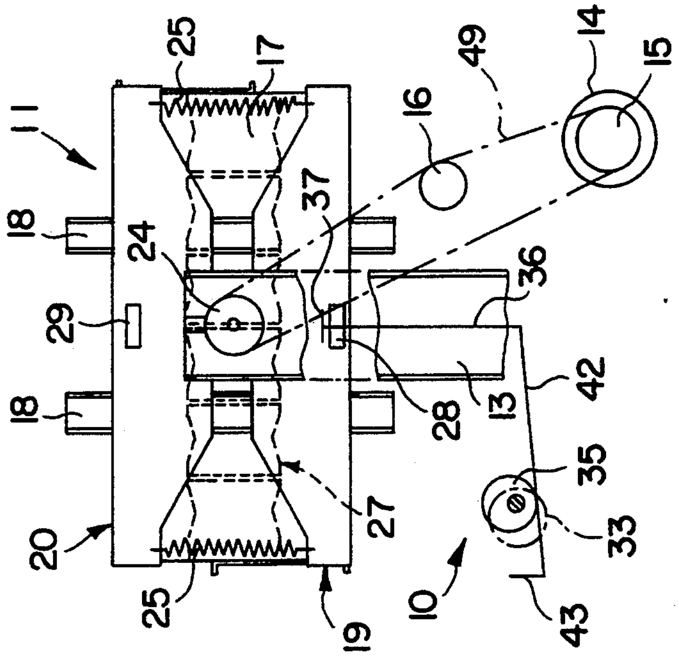
FIG. 6(*a*) schematically illustrates a vertical cross sectional view of the glass transferring apparatus according to the preferred embodiment of this invention in a load free state, and FIG. 6(*b*) schematically illustrates a left side view thereof.
Figure 6A:
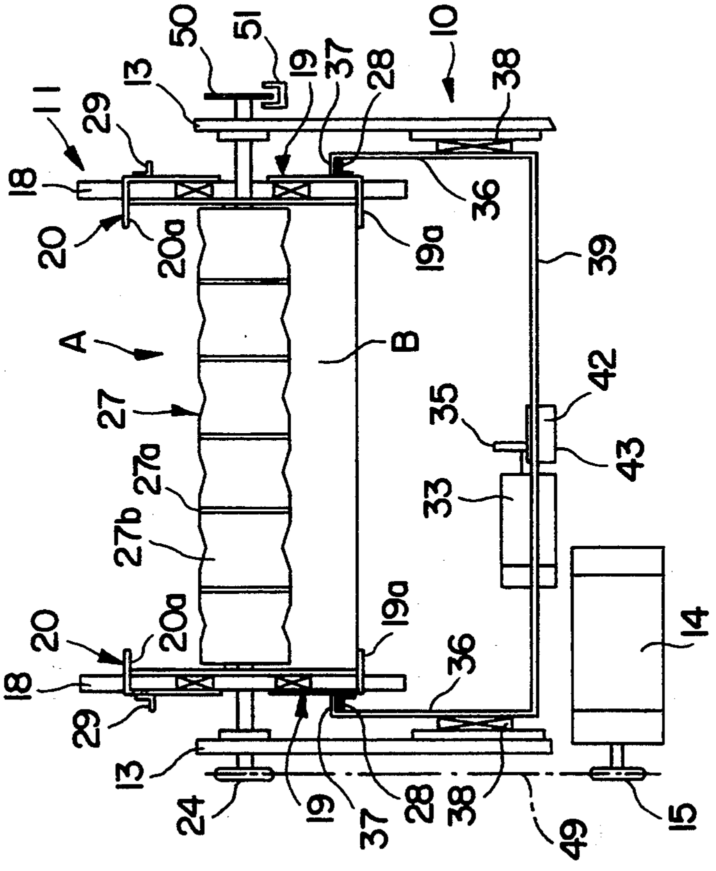

FIG. 6 shows the glass transferring apparatus according to this embodiment in a load free state. More specifically, the eccentric cam 35 of the second motor 33 is not performing the cam action described referring to FIG. 3, so that the first slide plate 19 locating at the lower position of the rotary section 11 is assuming a stand-by posture where it is in the closest positional relationship with the second slide plate 20 locating at the upper position by the tensile strength of the tension springs 25. In this state neither an empty rack 46 nor a rack with glasses 47 is present in the upper space A defined above the partitioning guide 27 or the lower space B defined therebelow, and the first motor 14 is assuming a stand-by posture. It should be noted here that the tongue 37 each slider 36 is spaced slightly upward from the first engagement piece 28 of the corresponding first slide plate 19.

Figure 7B:
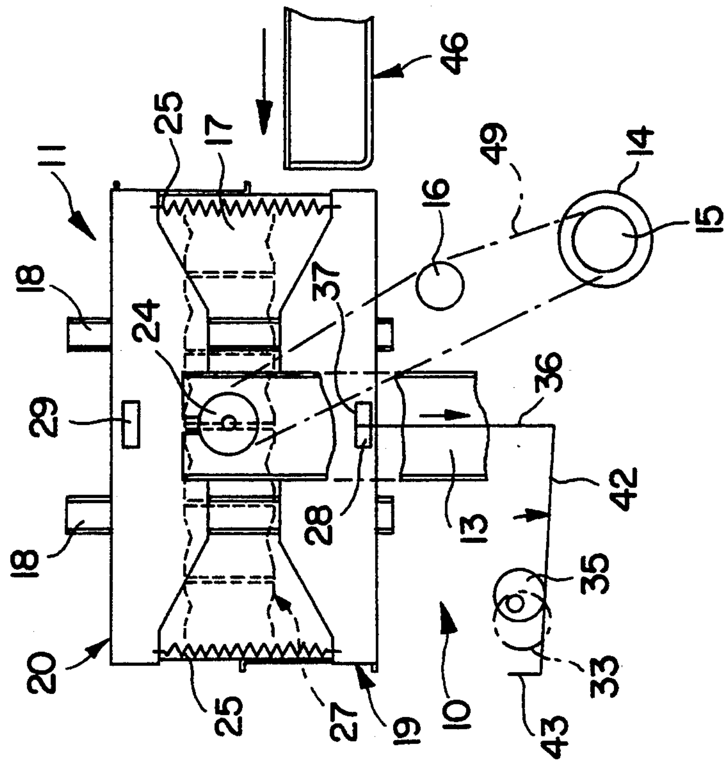
FIG. 7(*a*) schematically illustrates a vertical cross sectional view of the motion of the apparatus according to the preferred embodiment of this invention for widening the space for introducing a rack therein, and FIG. 7(*b*) schematically illustrates a left side view thereof.
Figure 7A:
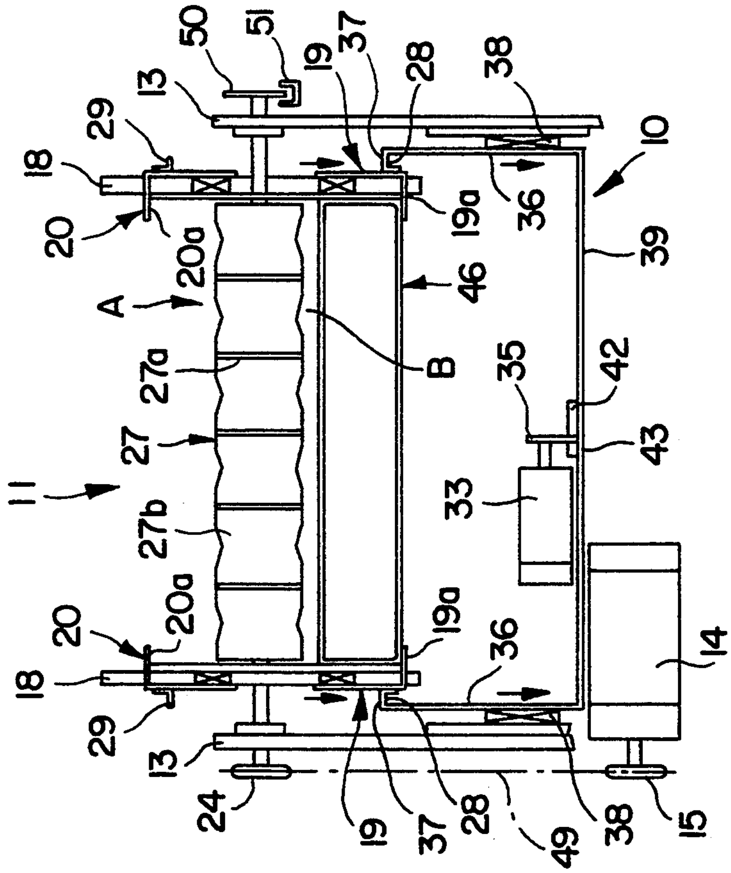

FIG. 7 shows the opening motion of the first slide plate 19 for widening the lower space B defined below the partitioning guide 27 in the rotary section 11 to allow introduction of a rack 46 thereto. More specifically, the eccentric cam 35 is rotated eccentrically by driving the second motor 33, as described above referring to FIG. 3, to push down the swing plate 42 on the hinge 43 under the cam action with the roller 44. Accordingly, the sliders 36 both connected to the horizontal plate 39 are pushed down against the resilience of the tension springs 40. The tongue 37 formed at the upper end portion of each slider 36 is engaged with the corresponding first engagement piece 28 extending horizontally from the first slide plate 19 to further push down the first slide plate 19 against the resilience of the tension springs 25. Thus, the lower space B below the partitioning guide 27 in the rotary section 11 is widened to allow introduction of an empty rack (carrying no glass 47 therein) horizontally thereto from the right side in terms of FIG. 7. The empty rack 46 is inserted into the lower space B below the partitioning guide 27 with the opening thereof facing upward.

Figure 8B:
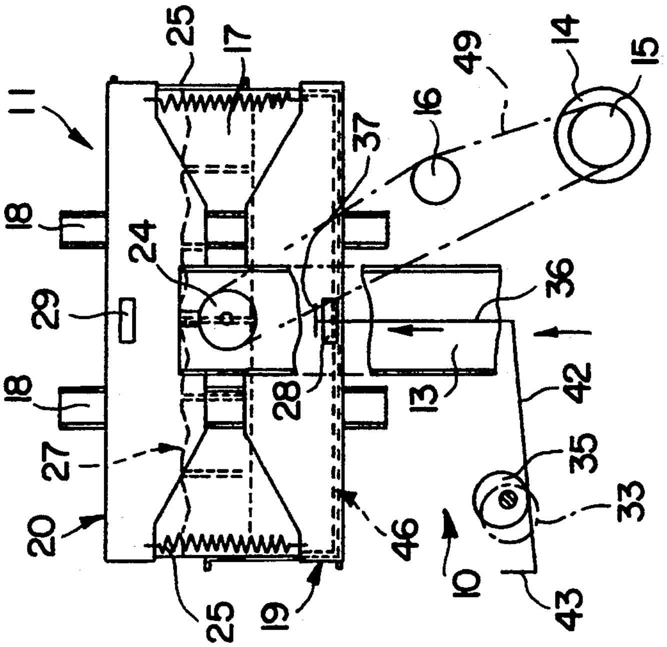
FIG. 8(*a*) schematically illustrates a vertical cross sectional view of the apparatus according to the preferred embodiment of this invention in a state where a first slide plate is ascended after an empty rack is inserted to the space defined below the partitioning guide and holding the bottom of the rack on the rack supporting portion, and FIG. 8(*b*) schematically illustrates a left side view thereof.
Figure 8A:
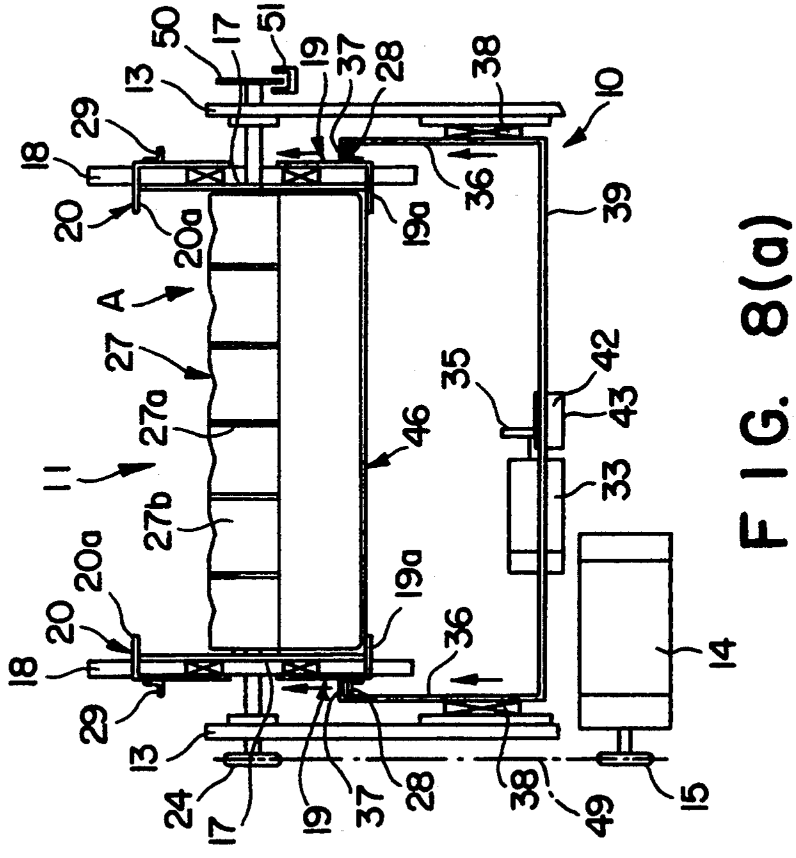

FIG. 8 shows a state where the first slide plate 19 is ascended after the empty rack 46 is inserted to the lower space B below the partitioning guide 27, to support the rack 46 at the bottom on the rack supporting portion 19*a*. Namely, introduction of the empty rack 46 to the lower space B below the partitioning guide 27 is detected by a sensor (not shown) to rotate the second motor 33 so as to release the cam action of the eccentric cam. Thus, the force pushing down the swing plate 42 shown in FIG. 3 is released to allow the sliders 36 to ascend to the original positions by the resetting resilience of the tension springs 40. Accordingly, the force pushing down the first engagement pieces 28 in the first slide plates 19 are released to allow the slide plates 19 to ascend by the resetting resilience of the tension springs 25. It should be noted, however, that an empty rack 46 is already inserted to the lower space B below the partitioning guide 27, the ascending motion of the slide plates 19 is stopped when the rack supporting portions 19a of the respective first slide plates 19 are abutted against the bottom of the rack 46.

Figure 9B:
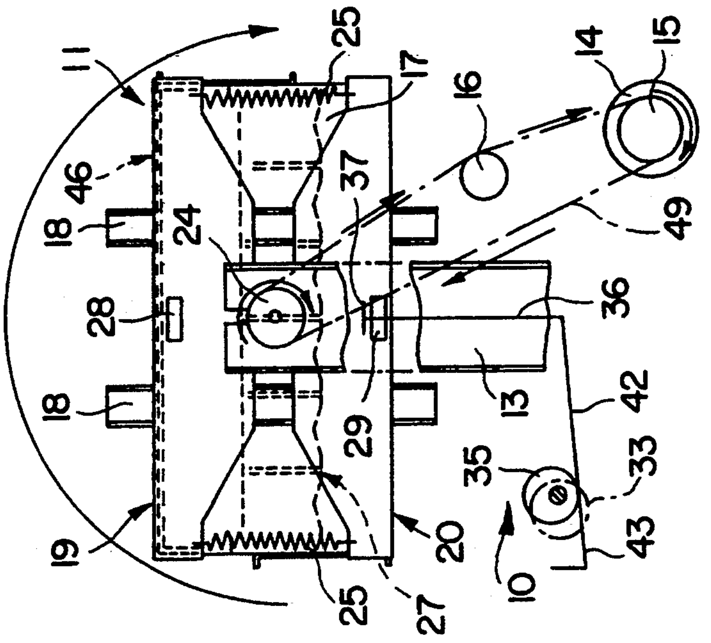
FIG. 9(*a*) schematically illustrates a vertical cross sectional view of the motion of the apparatus according to the preferred embodiment of this invention, in which the rack inserted to the space defined below the partitioning guide is turned to bring it to the space defined above the partitioning guide, and FIG. 9(*b*) schematically illustrates a left side view thereof.
Figure 9A:
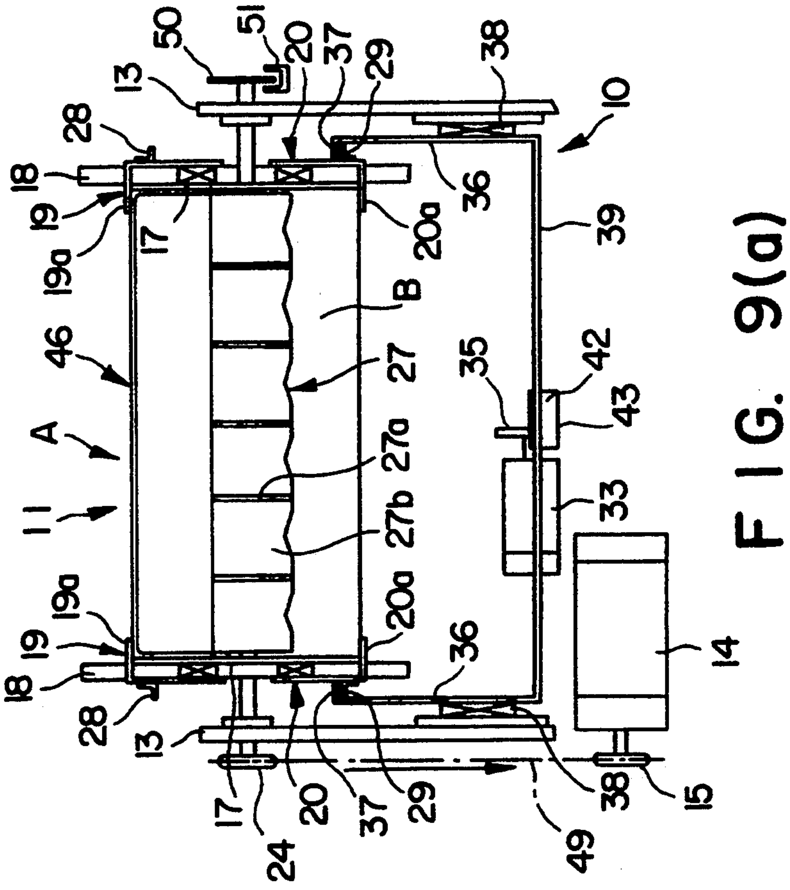

Next, FIG. 9 shows a motion of the rotary section 11 where it is turned, after an empty rack 46 is inserted to the lower space B below the partitioning guide 27, to bring the rack 46 to the upper space A above the partitioning guide 27. Namely, when the first motor 14 is driven in the state shown in FIG. 8, the rotary section 11 is turned by 180° under the motion transmitting action of the sprockets 15,24 and chain 49, whereby the attitude detection piece 50 is detected by the sensor 51 to stop the first motor 14. Thus, the empty rack 46 now locates in the upper space A above the partitioning guide 27 with the opening thereof facing downward. Namely, the upper space A which was present before the rotary section 11 is turned is now present as the lower space B below the partitioning guide 27.

Figure 10B:
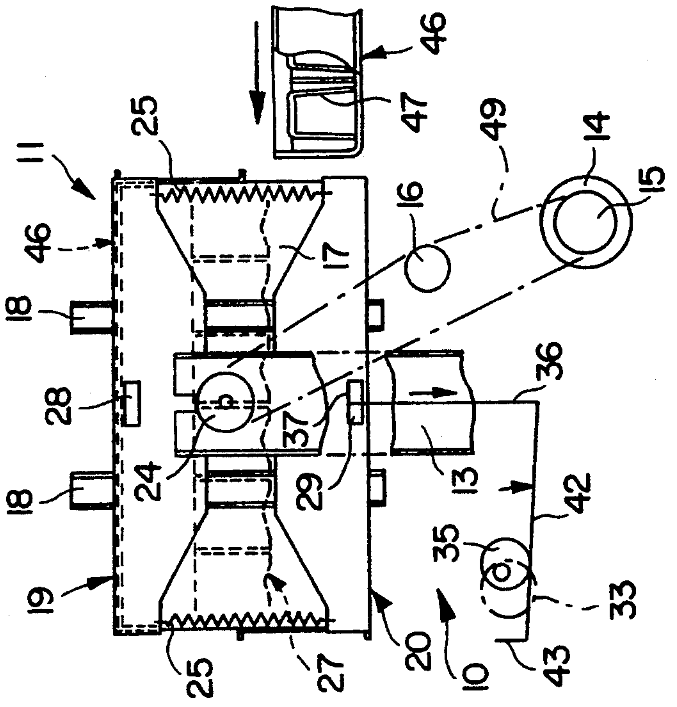
FIG. 10(*a*) schematically illustrates a vertical cross sectional view of the motion of the apparatus according to the preferred embodiment of this invention, in which the space defined below the partitioning guide is widened to allow a rack with washed glasses to be introduced thereto, and FIG. 10(*b*) schematically illustrates a left side view thereof.
Figure 10A:
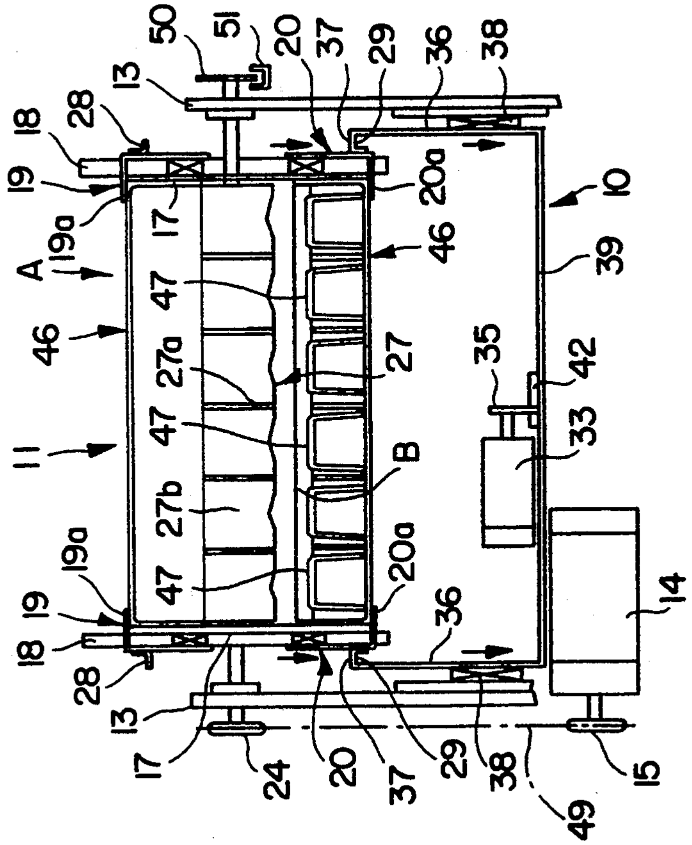

FIG. 10 shows how the lower space B below the partitioning guide 27 is widened to allow introduction of a rack 46 with washed glasses 47. Namely, in the state shown in FIG. 9, an empty rack 46 locates in the upper space A above the partitioning guide 27 with no rack 46 in the lower space B below the partitioning guide 27. By the turning of the rotary section 11 by 180°, the second slide plates 20 located on the upper space A side immediately before the turning, come to locate on the lower space B side.

Accordingly, the second engagement pieces 29 provided on the respective slide plates 20 come to locate immediately below the tongues 37 of the sliders 36, respectively. If the second motor 33 is driven in this state, the swing plate 42 is pushed down under the cam action of the eccentric cam 35 as described referring to FIG. 7, in turn, to push down the sliders 36 against the resilience of the tension springs 40. Thus, the tongues 37 formed at the upper end portions of the respective sliders 36 are engaged with the second engagement pieces 29 to further push down the second slide plates 20 and widen the lower space B below the partitioning guide 27. A rack 46 carrying washed glasses 47 therein in the inverted posture is then fed horizontally and inserted to the lower space B from the right side in terms of FIG. 10.

Figure 11B:
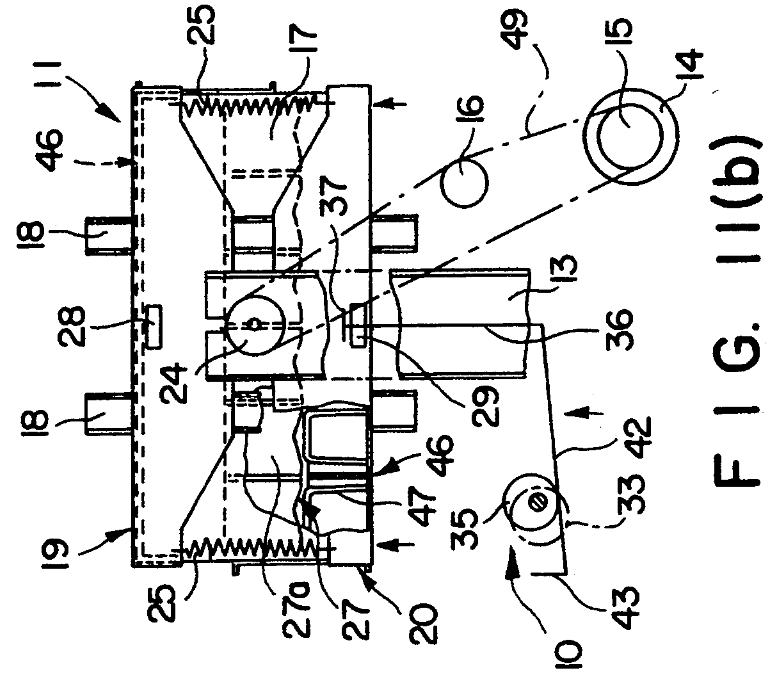
FIG. 11(*a*) schematically illustrates a vertical cross sectional view thereof the apparatus according to the preferred embodiment of this invention in which the rack with washed glasses is introduced to the space defined below the partitioning guide and the second slide plate is ascended to hold the bottom of the rack on the rack supporting portion, and FIG. 11(*b*) schematically illustrates a left side view thereof.
Figure 11A:
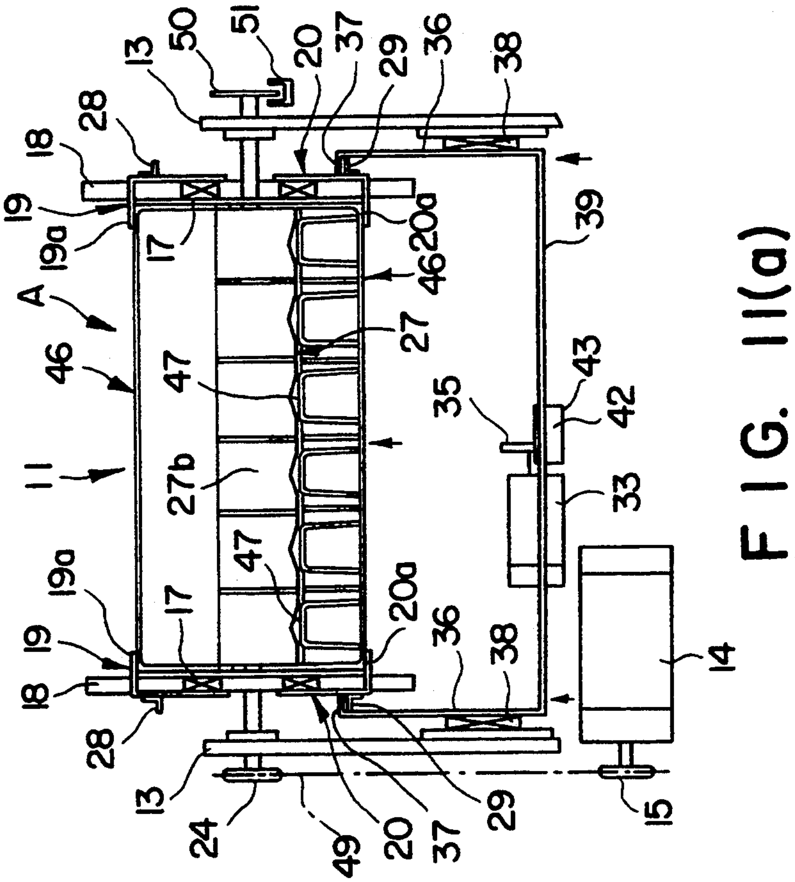

FIG. 11 shows a state where the second slide plates 20 are ascended after introduction of the rack 46 with glasses 47 to the lower space B below the partitioning guide 27 to support the rack 46 at the bottom on the rack supporting portions 20*a* thereof. Namely, when the sensor (not shown) detects introduction of the rack 46 with glasses 47 to the lower space B below the partitioning guide 27, the second motor 33 is rotated so as to release the cam action of the eccentric cam 35, whereby the force pushing down the swing plate 42 is released to allow the sliders 36 to ascend to the original positions by the resetting resilience of the tension springs 40. Accordingly, the force pushing down the second engagement pieces on the second slide plates 20 is also released to allow the slide plates 20 to ascend by the resetting resilience of the tension springs 25. It should be noted here that a rack 46 is already inserted to the lower space B below the partitioning guide 27, the ascending motion of the second slide plates 20 is stopped when the rack supporting portions 20*a* of the respective second slide plates 20 are abutted against the bottom of the rack 46.

Figure 12B:
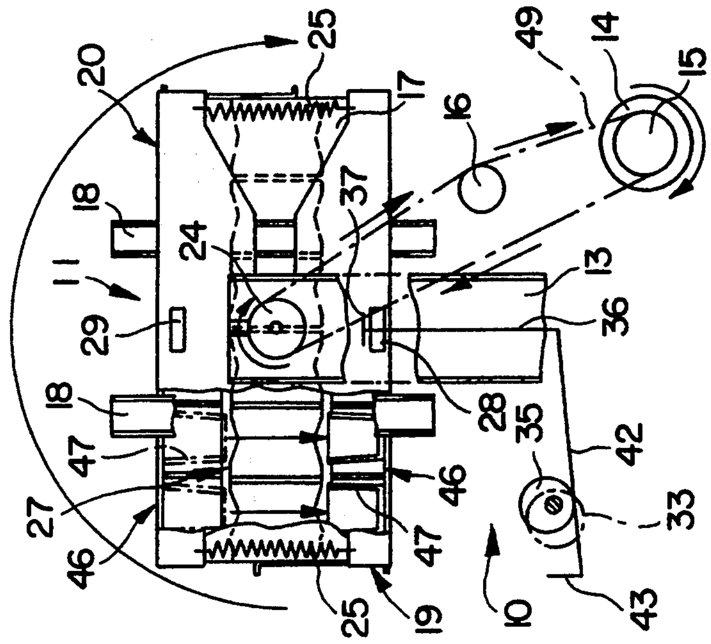
FIG. 12(*a*) schematically illustrates a vertical cross-sectional view thereof the apparatus according to the preferred embodiment of this invention, in which the rack carrying glasses in the inverted posture introduced to the space defined below the partitioning guide is turned by 180° C. to transfer the glasses into an empty rack in the normal posture, and FIG. 12(*6*) schematically illustrates a left side view thereof FIG. 13(*a*) schematically illustrates a vertical cross sectional view of the motion of the apparatus according to the preferred embodiment of this invention, in which the rack carrying the glasses transferred into the normal posture is drawn out of the space below the partitioning guide, and FIG. 13(*b*) schematically illustrates a left side view thereof.
Figure 12A:
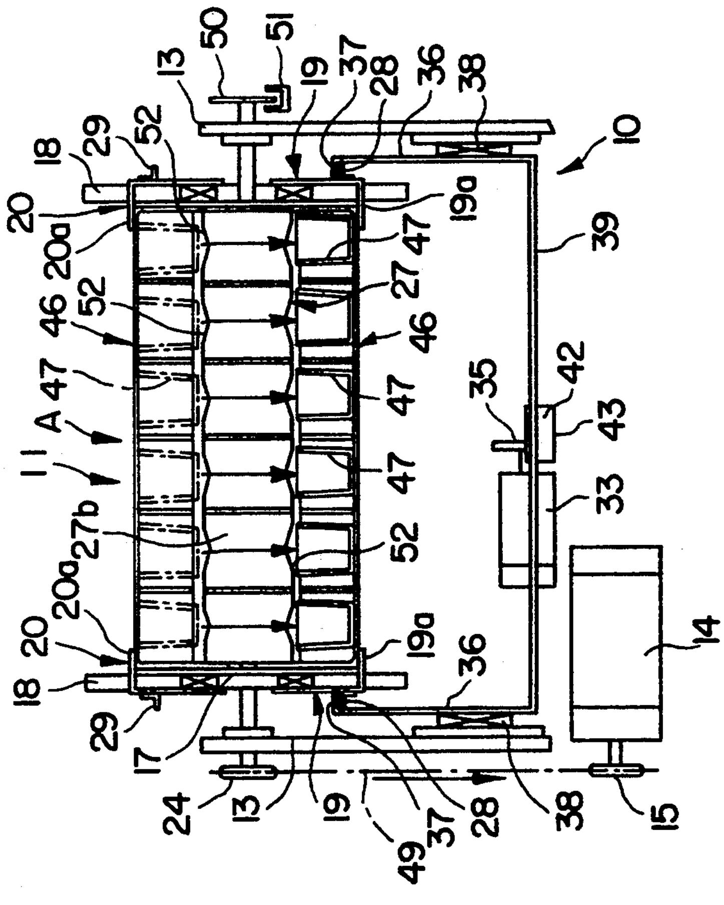

FIG. 12 shows a motion of the rotary section 11, where it is turned by 180° after introduction of the rack 46 carrying glasses 47 therein in the inverted posture to the lower space B below the partitioning guide 27 to transfer the glasses 47 to the empty rack 46 into the normal posture. More specifically, when the first motor 14 is started in the state shown in FIG. 11, the rotary section 11 is turned by 180°, and the sensor 51 detects the detection piece 50 to stop the first motor 14. Thus, the rack 46 carrying the glasses 47 in the inverted posture is brought to the upper space A above the partitioning guide 27, while the empty rack 46 in the lower space B. During the process where the rack 46 with inverted glasses 47 is moved to the upper position in accordance with the turning of the rotary section 11, the glasses 47 are brought into the normal posture and start to fall down by their own weights toward the partitioning guide 27. The glasses 47 passed through the respective pigeonholes of the partitioning guide 27 are transferred to the corresponding pigeonholes in the empty rack 46 locating in the lower space B. As described above, each portion of the longitudinal and transversal partitions 27*a*,27*b* forming a pigeonhole has very gentle V-shaped slopes 52 at the upper end face and the lower end face, respectively. Accordingly, when the glasses 47 in the rack 46 locating in the upper space A are transferred to the empty rack 46 locating in the lower space B, the glasses 47, if caught by the bottoms on the upper end faces of the pigeonholes, slide along the V-shaped slopes 52 to be guided properly downward and transferred smoothly to the lower rack 46.

Figure 13B:
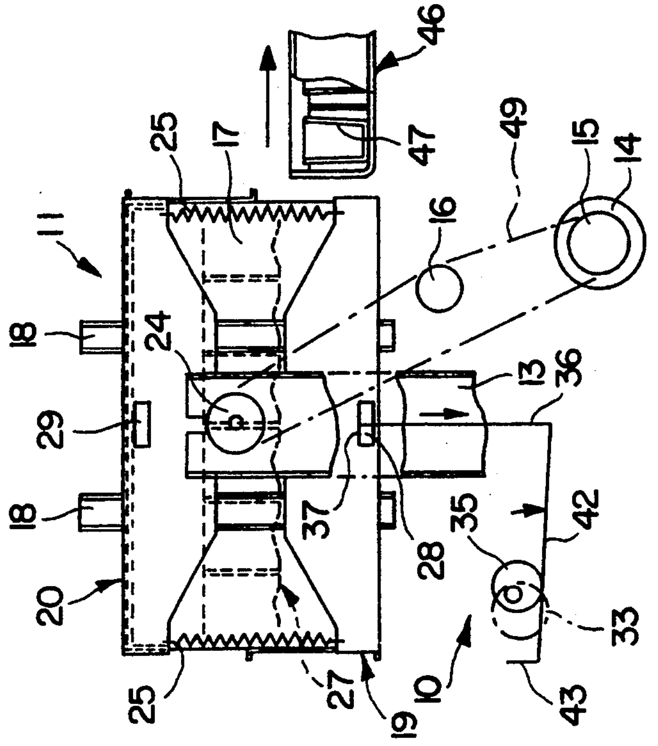
Figure 13A:
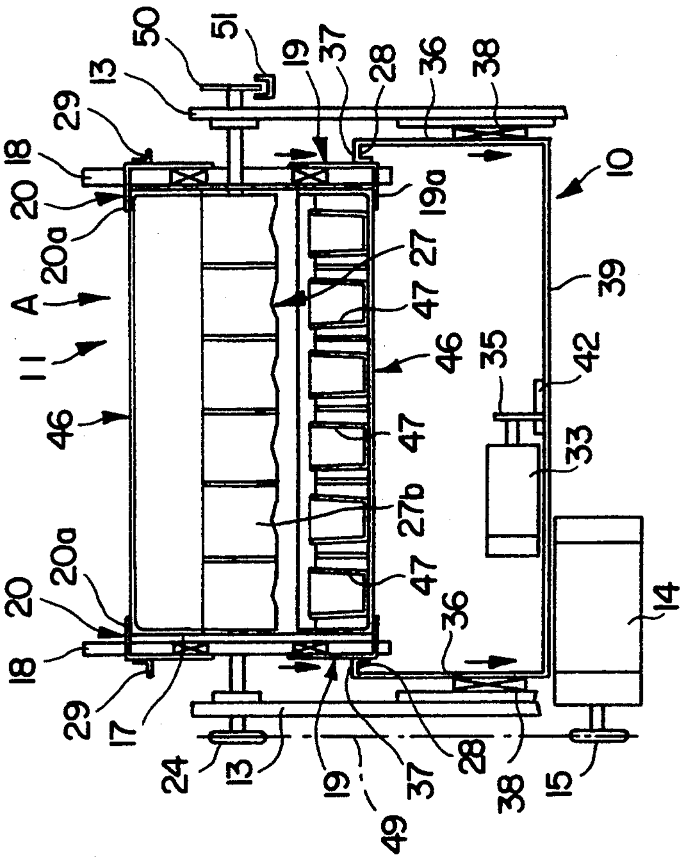

FIG. 13 shows how the rack 46 carrying the glasses 47 therein in the normal posture is drawn out of the lower space B below the partitioning guide 27. More specifically, when the second motor 33 is driven to rotate the eccentric cam 35, the swing plate 42 is pushed down under the cam action with the roller 44 to push down the sliders 36 both connected to the horizontal plate 39 against the resilience of the tension springs 40. Thus, the tongues 37 formed at the upper end portions of the respective sliders 36 are engaged with the horizontal portion of the first engagement pieces 28 of the first slide plates 19 to further push down the first slide plates 19 against the resilience of the tension springs 25. Thus, the lower space B below the partitioning guide 27 in the rotary section 11 is widened to allow drawing out of the rack 46 with glasses 47 therefrom horizontally in the normal posture. The rack 46 which is now empty after releasing the glasses 47 locates in the upper space A above the partitioning guide 27 with the opening thereof facing downward to wait for the subsequent glass transferring operation.

What is claimed is:

1. An apparatus for transferring glasses from rack to rack, comprising:
   - a fixed section disposed in a box-like body;
   - a pair of vertical braces disposed to said fixed section to oppose each other with a predetermined distance therebetween;
   - a rotary section supported at upper portions of said vertical braces so as to be able to rotate horizontally; and
   - a first motor disposed in said fixed section for turning said rotary section at least by 180°;

wherein said rotary section further comprises:
   - a partitioning guide consisting of longitudinal partitions and transversal partitions crossing one another at predetermined intervals to form pigeonholes each having dimensions sufficient to allow the glasses to pass therethrough;
   - an upper rack accommodating space, defined above said partitioning guide, in which the rack with glasses can be accommodated in a horizontal posture with an opening thereof facing downward;
   - a lower rack accommodating space, defined below said partitioning guide, in which the rack can be accommodated in the horizontal posture with an opening thereof facing upward;
   - two pairs of first and second guide plates disposed descendably on an outer side of side panels supporting said partitioning guide therebetween, one end of each guide plate being bent to form an L-shaped rack supporting portion, and each pair being normally pulled nearer resiliently to each other;
   - while said fixed section has mounted thereon a second motor for selectively descending the first guide plates or second guide plates to widen a space defined below the partitioning guide.

2. The apparatus for transferring glasses from rack to rack according to claim 1, wherein each portion of said longitudinal partitions and transversal partitions in said partitioning guide defining a the pigeonholes has very gentle V-shaped slopes at upper and lower end faces so as to guide the glasses to slide smoothly along the V-shaped slopes downward when the glasses fall down toward the lower rack.

* * * * *